United States Patent [19]

Taketani et al.

[11] 4,101,458

[45] Jul. 18, 1978

[54] ELECTROLYTE FOR ELECTROLYTIC CAPACITORS

[75] Inventors: Yutaka Taketani; Shinichi Niwa, both of Osaka, Japan

[73] Assignee: Sanyo Electric Co., Ltd., Osaka, Japan

[21] Appl. No.: 752,975

[22] Filed: Dec. 21, 1976

Related U.S. Application Data

[63] Continuation-in-part of Ser. No. 554,011, Feb. 28, 1975, abandoned.

[30] Foreign Application Priority Data

Nov. 16, 1973 [JP] Japan ................. 48-129869
Feb. 28, 1975 [DE] Fed. Rep. of Germany ....... 2508904

[51] Int. Cl.$^2$ ............................................. H01G 9/02
[52] U.S. Cl. ................................ 252/62.2; 361/433
[58] Field of Search ..................... 252/62.2; 361/433

[56] References Cited

U.S. PATENT DOCUMENTS

| | | | |
|---|---|---|---|
| 2,923,867 | 2/1960 | Robinson | 252/62.2 X |
| 3,812,039 | 5/1974 | Niwa | 252/62.2 |
| 3,835,055 | 9/1974 | Chesnot | 252/62.2 |

*Primary Examiner*—Jack Cooper
*Attorney, Agent, or Firm*—Armstrong, Nikaido, Marmelstein & Kubovcik

[57] ABSTRACT

An electrolyte for electrolytic capacitors comprising N-ethylformamide or its mixture with any other solvent containing at least about 10% by weight of N-ethylformamide and an acid salt of maleic acid with ammonia or an amine. The electrolyte can be used in electrolytic capacitors designed to operate in a temperature range of about −65° to 100° C.

4 Claims, No Drawings

ELECTROLYTE FOR ELECTROLYTIC CAPACITORS

This is a continuation-in-part application of Ser. No. 554,011, filed Feb. 28, 1975, now abandoned.

This invention relates to an electrolyte for electrolytic capacitors capable of being operated over a wide temperature range.

In electrolytic capacitors, there have been used various kinds of operating electrolytes such as, for example, those consisting of borates dissolved in glycols. However, the capacitance of capacitors made with these conventional electrolytes falls off abruptly at low temperatures of about −25° C and below. Thus, these electrolytes can be used only in electrolytic capacitors designed to operate in a temperature range of about −25° to +85° C.

In order to avoid such inconvenience, attempts have been made to obtain an electrolyte which can be used in electrolytic capacitors designed to operate over a wider temperature range. For example, the use of an electrolyte consisting of N-methylformamide and an acid salt of maleic acid is recently proposed in U.S. Pat. No. 3,812,037. Electrolytic capacitors made with this electrolyte can be operated in a temperature range of about −40° to +85° C, but the capacitance thereof falls off at low temperatures below about −40° C, particularly at about −50° C as the electrolyte therein begins to freeze at these temperatures.

As will be seen from the above, the low temperature characteristic of electrolytic capacitors is influenced by physical properties of the electrolyte, particularly by the freezing point thereof. It is therefore preferred to use an electrolyte having a lower freezing point. The freezing point of the electrolyte comprising N-methylformamide (hereinafter referred to as "NMF") will be lowered by replacing some parts of NMF with any other solvent, such as dimethylformamide or ethylene glycol. However, the use of dimethylformamide as a part results in the deterioration of the life characteristics at high temperatures of electrolytic capacitors. Further, the use of ethylene glycol as a part results in the deterioration of the low temperature characteristics of electrolytic capacitors. On the other hand, there are known electrolytic capacitors with the electrolyte wherein dimethylformamide or ethylene glycol is employed as a sole or major solvent. However, the one using dimethylformamide is much decreased in capacitance when placed at a high temperature (e.g. 85° C) for a long period of time (e.g. 250 hours) since dimethylformamide passes through a usual sealing with a rubber packing due to its relatively high permeability and low boiling point (i.e. about 153° C). Further, the one using ethylene glycol is extremely lowered in capacitance at a low temperature because of the increase in specific resistance attributable to its increase in viscosity; i.e. the viscosity of ethylene glycol at 25° C is about 14.5 cp, and that at −40° C is several thousands cp. It is therefore required to choose a solvent having a high boiling point, a low freezing point and a low viscosity even at a low temperature.

A main object of the present invention is to provide an electrolyte for electrolytic capacitors capable of being operated in a wide range of temperatures. Another object of this invention is to provide an electrolytic capacitor which can operate over a wide range of temperatures. These and other objects of the invention will be apparant to those skilled in the art from the foregoing and subsequent descriptions.

As the results of the study seeking a solvent having a wide temperature range of liquidity, it has been found that some of amides maintain a liquid form within a broader range of temperature than NMF. At the same time, it has also been found that all the amides having a wider temperature range of liquidity are not always those which can be used as a solvent for an electrolyte since they are hydrolyzed at a high temperature in the presence of water. An electrolyte to be used in dry electrolytic capacitors is required to contain a small amount of water to form a dielectric layer on the surface of the anode metal. Even if an electrolyte is of anhydrous, a small amount of water is introduced therein as an impurity in a solvent or solute and as absorbed water in a seprating paper. Thus, when an amide is used as a solvent, it is inevitably hydrolyzed at a high temperature to a carboxylic acid and an amine. For example, NMF is hydrolyzed to formic acid and monomethylamine. The formation of formic acid or a formate causes the increase of the leakage current of an electrolytic capacitor, especially for high-voltage ratings more than 35 V since an available voltage for forming a dielectric layer, for an electrolyte containing a formate is extremely low, up to 25 - 35 V. The hydrolysis of an amide at high temperatures in an inevitable disadvantage for an electrolyte containing the same, but it is possible to reduce its influence by the use of an amide having a low rate of hydrolysis. It is therefore required to choose an amide solvent having a low rate of hydrolysis as well as a wide temperature range of liquidity and a low viscosity.

It has now been found that the requirements mentioned above are fully met by the use of N-ethylformamide as a solvent.

As shown in Table 1, N-ethylformamide (hereinafter referred to as "NEF") can maintain a liquid form within a broader range of temperature than NMF.

Table 1

| Solvent | Boiling Point (° C) | Freezing Point (° C) | Specific gravity at 25° C (g/cm$^3$) | Viscosity at 25° C (cp) | Viscosity at −40° C (cp) |
|---|---|---|---|---|---|
| NEF | 195–200 | −45 to −50 | 0.952 | 2.23 | 14.5 |
| NMF | 185–190 | −2 to −3 | 1.00 | 1.03 | 8.9 |

The hydrolysis of an amide solvent causes the decrease of the specific resistance thereof so that the rate of hydrolysis of the amide solvent may be determined by the measurement of the specific resistance for each solvent before and after accelerated tests, using a high ambient temperature for exposure of the amide solvent.

As shown in Table 2, the specific resistance of NMF decreases greatly, as compared with that of NEF, so that the rate of hydrolysis of NEF is considerably smaller than that of NMF.

Table 2

| Solvent (ml) | Initial (ohm-cm) | After accelerated test at 85° C for 500 h. | After accelerated test at 100° C for 200 h. |
|---|---|---|---|
| NMF 95 H$_2$O 5 | 3600 | 500 | 310 |
| NEF 95 H$_2$O 5 | 3200 | 2200 | 1450 |

According to the present invention, there is provided an electrolyte for electrolytic capacitors consisting essentially of a solvent and a solute dissolved therein, wherein said solvent consists essentially of an amide solvent containing at least 10% by weight of NEF (N-ethylformamide) and said solute is an acid salt of maleic acid with ammonia or an amine.

The solvent for the electrolyte of the invention may consist of NEF alone or its mixture with any other solvent insofar as such other solvent does not make considerably inferior the favorable characteristics of NEF itself. Examples of the solvent to be used with NEF are amides such as NMF, dimethylformamide, diethylformamide and dimethylacetamide. When NEF is used with these solvents, the concentration of NEF therein may be not less than about 10% by weight.

As the solute for the electrolyte of the invention, there may be used acid salts of maleic acid with ammonia or amines. The following acid salts are exemplified: acid ammonium maleate, acid monomethylammonium maleate, acid monoethylammonium maleate, acid triethylammonium maleate, acid diethylammonium maleate, acid dimethylammonium maleate, etc. Among them, acid triethylammonium maleate is particularly preferred.

The solute is employed in a concentration of at least about 1% by weight but not exceeding a concentration corresponding to a saturated solution of the solute in the solvent, preferably from about 5 to 30% by weight.

The electrolyte of this invention can maintain a low viscosity without any considerable variation on the change of temperature and show a high conductivity over a wide temperature range. The electrolytic capacitors made with the electrolyte of the invention can be operated in a temperature range of about −65° to +100° C without any considerable deterioration of the characteristics.

The electrolyte of the invention may be prepared by mixing together NEF or its mixture with any other solvent and an acid salt of maleic acid with ammonia or an amine at room temperature.

Practical and presently preferred embodiments of the invention are illustratively shown in the following Examples.

EXAMPLE 1

As shown in Table 3, a certain amount of acid ammonium maleate was dissolved in a certain amount of a solvent to make an electrolyte.

The specific resistance measured on the electrolyte according to a standard procedure at various temperatures is shown in Table 3, from which it is understood that the electrolyte using as the solvent NEF or its mixture with NMF shows an appreciable specific resistance even at a low temperature of about −65° C, whereas the electrolyte using any other solvent such as NMF or ethylene glycol alone does not exhibit any specific resistance.

Table 3

| Electrolyte No. | Solvent (ml) | Solute (g) | Specific resistance (Ω.cm) +25° C | −25° C | −40° C | −65° C |
|---|---|---|---|---|---|---|
| A | NEF (100) | Acid ammonium maleate (10) | 115 | 400 | 950 | 5000 |
| B | NMF (80) NEF (20) | Acid ammonium maleate (10) | 80 | 250 | 550 | 2000 |
| C | NMF (100) | Acid ammonium maleate (10) | 72 | 220 | 450 | — |
| D | Ethylene glycol (100) | Acid ammonium maleate (30) | 125 | 1400 | above 10 KΩ.cm | — |

EXAMPLE 2

As shown in Table 4, a certain amount of a salt was dissolved in 100 ml of NEF to make an electrolyte.

The specific resistance measured on the electrolyte according to a standard procedure at 25° C is shown in Table 4, from which it is understood that the electrolyte using as the solute an acid maleate shows a lower specific resistance than the electrolyte using any other salt.

Table 4

| Electrolyte No. | Solvent (ml) | Solute (g) | Specific resistance at 25° C (Ω.cm) |
|---|---|---|---|
| E | NEF (100) | Acid monomethylammonium maleate (20) | 80 |
| F | NEF (100) | Acid monoethylammonium maleate (20) | 90 |
| G | NEF (100) | Maleic acid (10) Triethylamine (11.9 ml) | 95 |
| H | NEF (100) | Ammonium picrate (10) | 150 |
| I | NEF (100) | Salicylic acid (6) Triethylamine (6 ml) | 180 |
| J | NMF | Maleic acid (10) Triethylamine (11.9 ml) | 65 |

EXAMPLE 3

An aluminium dry electrolytic capacitor was manufactured by the use of the electrolyte No. A, B, C, D, F or G, and the electric properties of the electrolytic capacitor were determined at a rating of 33 μF and a voltage of 25 V. The results are shown in Tables 5 (Temperature Characteristics), 6 (Endurance Test) and 7 (Shelf Test) wherein "Cap." is capacitance and "L.C." is leakage current, from which it is understood that the electrolytic capacitor made with the electrolyte of the invention produces a markedly improved performance over a wide range of temperature from low to high temperatures.

EXAMPLE 4

An aluminium dry electrolytic capacitor having the rating of a capacity of 47 μF and a voltage of 50 V was manufactured by the use of the electrolyte No. G or J. For the determination of the high-temperature performance, the electric properties of the capacitor were measured before and after the shelf test using a high ambient temperature for exposure of the capacitor in the absence of voltage. The test was carried out at 100° C for 200 hours. The results are shown in Table 8.

EXAMPLE 5

An aluminium dry electrolytic capacitor having the rating of a capacity of 10 μF and a voltage of 50 V was manufactured by the use of the electrolyte No. G or J. The electric properties of the capacitor were determined before and after the shelf tests. The test was carried out at 85° C for 500 hours. The results are shown in Tanle 9.

EXAMPLE 6

Using the electrolyte No. G or J, there was manufactured an aluminium dry electrolytic capacitor having the rating of a capacity of 220 μF and a voltage of 25 V. The electric properties of the capacitor were determined before and after shelf tests. The test was carried out at 100° C for 200 hours. The results are shown in Table 10.

From the results shown in Tables 8, 9 and 10, it is understood that the electrolytic capacitors made with the electrolyte G show very small leakage current, compared with those made with the electrolyte J, even if they are of high-voltage ratings. Accordingly, it is understood that the electrolytic capacitors according to the invention possess great stability even at high temperatures of up to 100° C.

Table 5

| Electrolyte No. | +85° C Cap. (%) | +85° C Tan δ (%) | +25° C Cap. (%) | +25° C Tan δ (%) | −25° C Cap. (%) | −25° C Tan δ (%) | −40° C Cap. (%) | −40° C Tan δ (%) | −65° C Cap. (%) | −65° C Tan δ (%) |
| --- | --- | --- | --- | --- | --- | --- | --- | --- | --- | --- |
| B | 106.6 | 3.5 | 100 | 4.0 | 93.5 | 6.5 | 92.9 | 9.0 | 87.5 | 35 |
| C | 106.7 | 3.5 | 100 | 3.5 | 93.1 | 6.0 | 92.8 | 8.5 | — | — |
| D | 107.5 | 3.5 | 100 | 5.0 | 91.2 | 32 | — | — | — | — |
| F | 105.7 | 4.0 | 100 | 4.5 | 93.7 | 8.0 | 92.1 | 13.5 | 83.3 | 82 |
| G | 106.3 | 4.0 | 100 | 4.5 | 94.0 | 8.5 | 92.0 | 14.0 | 82.5 | 88 |

Table 6

| Electrolyte No. | Initial value Cap. (%) | Initial value Tan δ (%) | Initial value L.C.μA/30″ | Value after 1000 hrs. Cap. (%) | Value after 1000 hrs. Tan δ (%) | Value after 1000 hrs. L.C.μA/30″ | Transfiguration on outer wall |
| --- | --- | --- | --- | --- | --- | --- | --- |
| A | 100 | 5.6 | 0.9 | 94.2 | 13.0 | 0.5 | None |
| C | 100 | 3.2 | 0.7 | 98.5 | 4.7 | 1.0 | None |
| F | 100 | 4.5 | 0.8 | 101.4 | 8.8 | 0.8 | None |
| G | 100 | 5.0 | 0.7 | 96.7 | 7.1 | 0.7 | None |

Note: A rated voltage was applied in a thermostatic bath set up at 85° C.

Table 7

| Electrolyte No. | Initial value Cap. (%) | Initial value Tan δ (%) | Initial value L.C.μA/30″ | Value after 200 hrs. Cap. (%) | Value after 200 hrs. Tan δ (%) | Value after 200 hrs. L.C.μA/30″ | Transfiguration on outer wall |
| --- | --- | --- | --- | --- | --- | --- | --- |
| A | 100 | 5.1 | 0.9 | 95.3 | 6.8 | 1.3 | None |
| C | 100 | 3.2 | 0.7 | 98.0 | 4.0 | 0.8 | None |
| F | 100 | 5.0 | 0.7 | 97.8 | 6.6 | 0.5 | None |
| G | 100 | 4.8 | 0.7 | 98.9 | 5.0 | 0.5 | None |

Note: No voltage was applied in a thermostatic bath set up at 85° C.

Table 8

| Electrolyte No. | Initial value Cap. (%) | Initial value Tan δ (%) | Initial value L.C.μA/30″ | Value after 200 hrs. Cap. (%) | Value after 200 hrs. Tan δ (%) | Value after 200 hrs. L.C.μA/30″ |
| --- | --- | --- | --- | --- | --- | --- |
| G | 100 | 1.8 | 2.5 | 98.3 | 2.5 | 3.1 |
| J | 100 | 1.3 | 2.8 | 98.9 | 1.6 | 10~20* |

Note: The asterisked values show the lowest and highest values of the objective since it shows a violent change.

Table 9

| Electrolyte No. | Initial value Cap. (%) | Initial value Tan δ (%) | Initial value L.C.μA/30″ | Value after 500 hrs. Cap. (%) | Value after 500 hrs. Tan δ (%) | Value after 500 hrs. L.C.μA/30″ |
| --- | --- | --- | --- | --- | --- | --- |
| G | 100 | 3.4 | 1.7 | 96.4 | 5.1 | 2.8 |
| J | 100 | 2.8 | 1.6 | 96.5 | 3.9 | 5~50* |

Note: The asterisked values show the lowest and highest values of the objective since it shows a violent change.

Table 10

| Electrolyte No. | Cap. (%) | Initial value Tan δ (%) | L.C.μA/30″ | Value after 200 hrs. Cap. (%) | Value after 200 hrs. Tan δ (%) | Value after 200 hrs. L.C.μA/30″ |
| --- | --- | --- | --- | --- | --- | --- |
| G | 100 | 3.0 | 5.1 | 98.9 | 3.8 | 4.8 |

Table 10-continued

| Electrolyte No. | Cap. (%) | Initial value Tan δ (%) | L.C.μA/30″ | Cap. (%) | Value after 200 hrs. Tan δ (%) | L.C.μA/30″ |
|---|---|---|---|---|---|---|
| J | 100 | 2.4 | 5.3 | 99.1 | 2.8 | 5.0 |

What is claimed is:

1. An electrolyte for electrolytic capacitors consisting essentially of a solvent, a solute dissolved therein, and an amount of water sufficient to form a dielectric layer on a capacitor anode, wherein said solvent consists essentially of an amide solvent containing at least 10% by weight of N-ethylformamide and said solute is an acid salt of maleic acid with ammonia or an amine, the amide solvent other than N-ethylformamide when present being selected from the group consisting of N-methylformamide, dimethylformamide, diethylformamide and dimethylacetamide.

2. The electrolyte of claim 1, wherein the solute is acid triethylammonium maleate.

3. The electrolyte of claim 1, wherein the comcentration of the solute therein is at least about 1% by weight but not exceeding the one corresponding to a saturated solution of the solute in the solvent.

4. The electrolyte of claim 3, wherein the concentration of the solute therein is from about 5 to 30% by weight.

* * * * *